C. J. OWEN.
ALARM FLOAT.
APPLICATION FILED SEPT. 15, 1909.
980,667.
Patented Jan. 3, 1911.
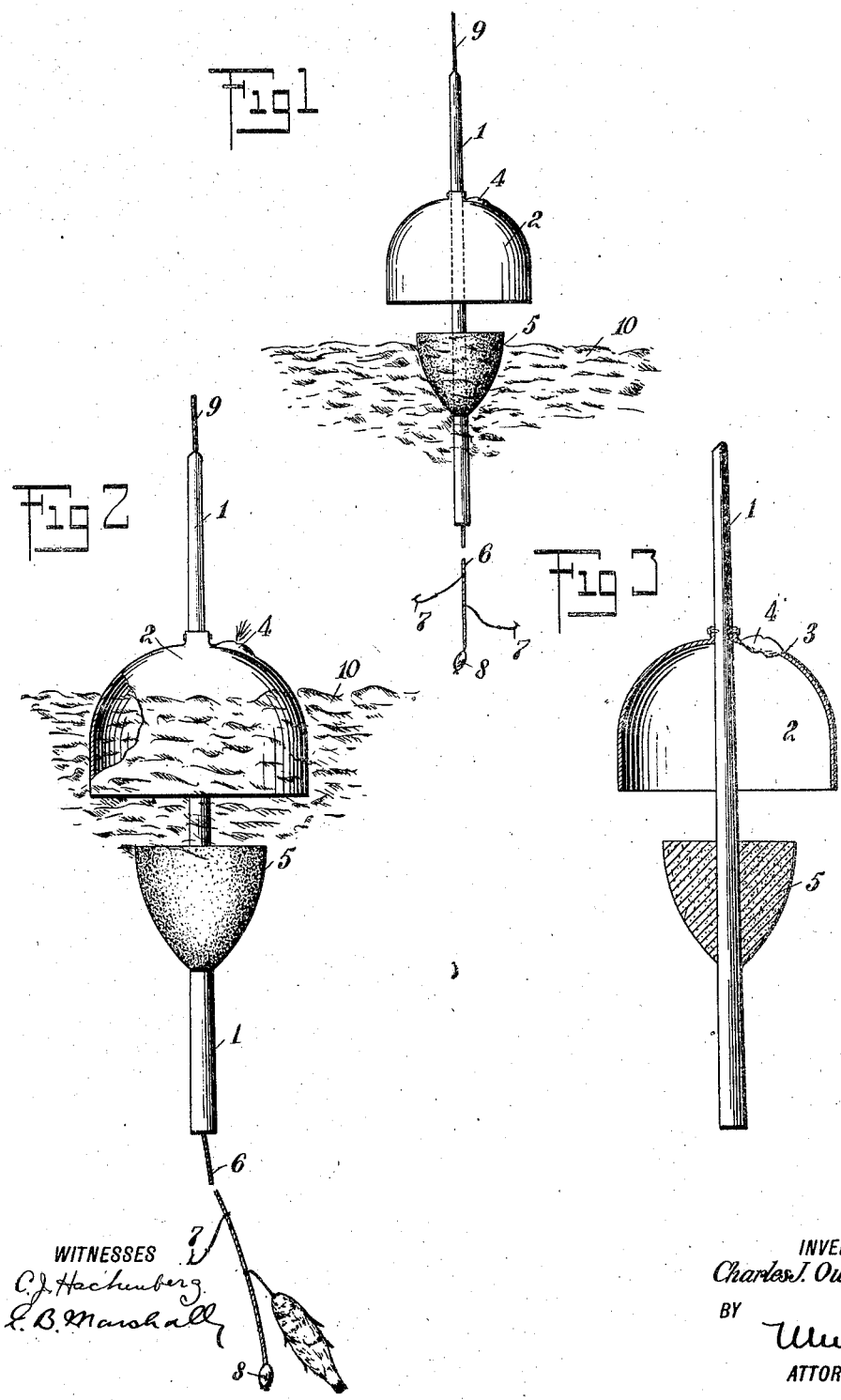
WITNESSES
INVENTOR
Charles J. Owen
BY
ATTORNEYS

UNITED STATES PATENT OFFICE.

CHARLES JOSEPH OWEN, OF JOPLIN, MISSOURI, ASSIGNOR OF ONE-HALF TO FRANK H. SPRING, OF JOPLIN, MISSOURI.

ALARM-FLOAT.

980,667.      Specification of Letters Patent.      Patented Jan. 3, 1911.

Application filed September 15, 1909. Serial No. 517,817.

*To all whom it may concern:*

Be it known that I, CHARLES JOSEPH OWEN, a citizen of the United States, and a resident of Joplin, in the county of Jasper and State of Missouri, have invented a new and Improved Alarm-Float, of which the following is a full, clear, and exact description.

My invention relates to alarm floats, and it has for its object to provide one to be used by fishermen, which will sound an alarm when a fish is caught on a hook connected by a line with the alarm float.

Still other objects of the invention will appear in the following complete description.

In this specification I will describe the preferred form of my invention, it being understood that the scope of the invention is defined in the appended claims.

Reference is to be had to the accompanying drawings forming a part of this specification in which similar characters of reference indicate corresponding parts in all the views.

Figure 1 is a side elevation showing my invention as it is used; Fig. 2 is a similar, but enlarged view, showing the position of the float when a fish is caught on a hook connected thereto; and Fig. 3 is a sectional elevation of the float shown in Fig. 2.

By referring to the drawings it will be seen that a spindle 1 is provided to which is secured an inverted cup 2, the spindle 1 passing through an opening at the center of the top of the inverted cup 2, at which point it is secured. There is an opening 3 in the inverted cup 2, and in this opening is disposed a whistle 4. To the spindle 1 below the bottom of the inverted cup 2, there is secured around the spindle the top of the float 5, the float being preferably cut smooth parallel with the plane of the bottom of the inverted cup 2, the sides of the float 5 tapering until they meet the spindle 1. To the bottom of the spindle 1 is secured a fishing line 6, having hooks 7 and a sinker 8, although as may be well understood by any fisherman, the sinker 8 may be omitted when fishing for certain kinds of fish. To the top of the spindle 1 is secured a fishing line 9, which is of some length and extends to the boat or dock at which point the fisherman is stationed.

In using the invention, bait is attached to the hook 7, and the device is permitted to float away with the current, the float 5 being adapted normally to support the spindle 1 at a sufficient height so that the bottom of the inverted cup 2 is disposed a little above the surface of the water. When a fish is caught on one of the hooks 7, his movements in the water in an effort to free himself draw on the line 6, which causes the spindle 1 to descend, which forces air into the inverted cup at its open bottom, thereby compressing the air escaping through the whistle 4 and sounding the alarm. It will therefore be seen that when my alarm float is being used it is wholly unnecessary for a fisherman to hold the fishing line, it being quite sufficient that he remain in the vicinity so that he will hear the alarm when it is sounded.

Having thus described my invention, I claim as new and desire to secure by Letters Patent:

1. In an alarm float, a cup open at the bottom, having an opening spaced from the bottom, a whistle disposed in the opening, a float disposed below spaced from the cup and a spindle connecting the float and the cup.

2. In an alarm float, an air chamber open at the bottom, a float disposed below the air chamber and spaced therefrom, a spindle secured to the air chamber and to the float, and an alarm supported by the air chamber and adapted to be operated by the compression of air in the said chamber.

3. In an alarm float, an air chamber open at the bottom, an alarm adapted to be operated by the compression of air in the chamber, a spindle to which the air chamber is secured, a float secured to the spindle, and a fishing line with a hook connected with the spindle.

4. In an alarm float, a spindle, a whistle connected to the spindle, a float secured to the spindle below the whistle, and a fishing line connected with the spindle.

5. In an alarm float, an air chamber open at the bottom with an opening thereabove, an alarm adapted to be operated by air passing through the opening, a spindle to which the air chamber is secured, a float secured to the spindle below the air chamber, and a line with a hook connected with the spindle.

In testimony whereof I have signed my name to this specification in the presence of two subscribing witnesses.

CHARLES JOSEPH OWEN.

Witnesses:
 CHAS. H. MILLER,
 W. S. PATE.